Nov. 29, 1938.  P. F. SPERRY  2,138,259
HEATING APPARATUS
Filed April 18, 1936  2 Sheets-Sheet 1
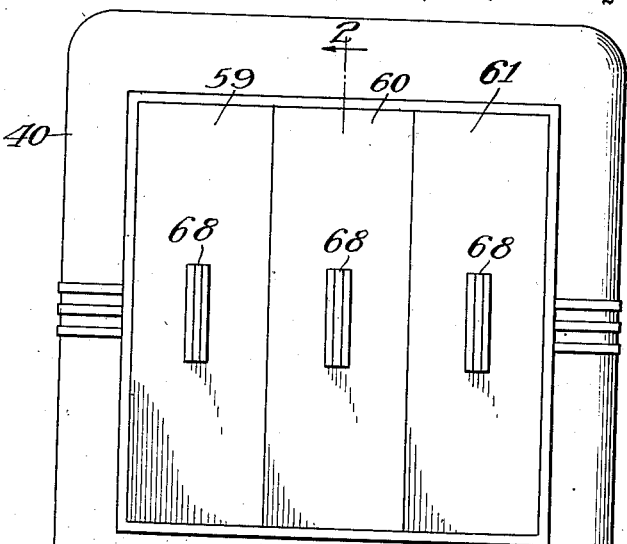
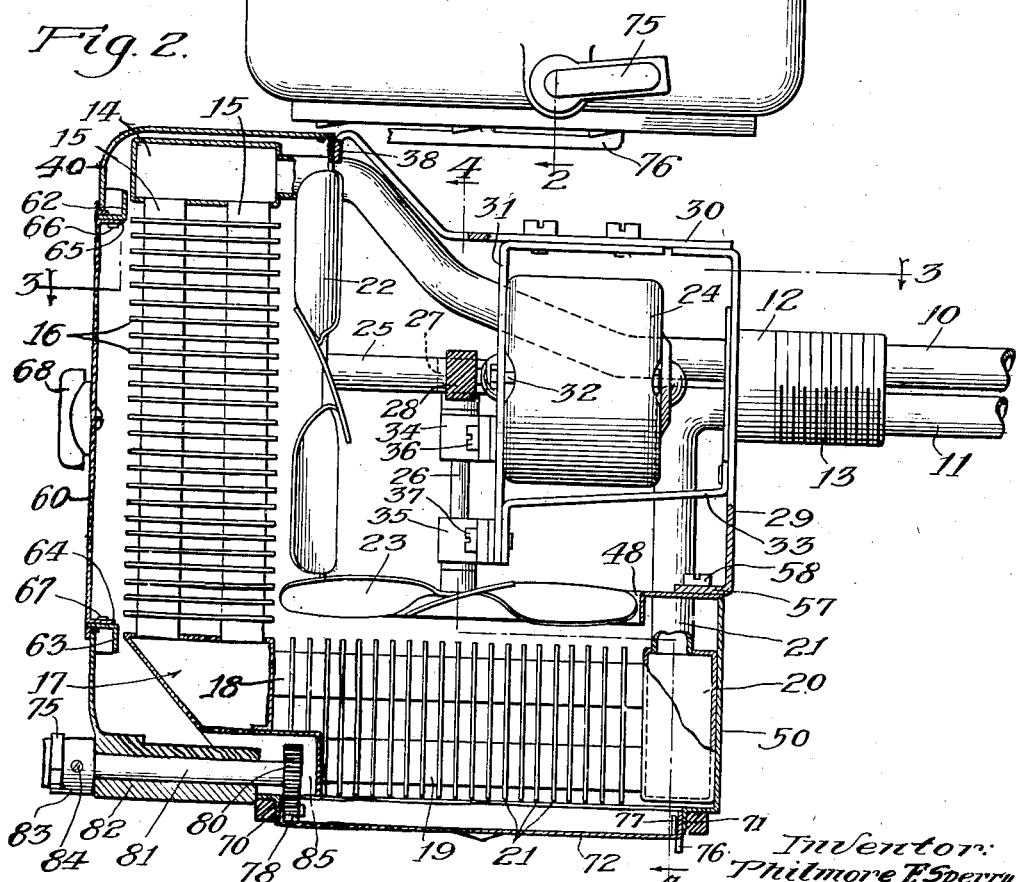
Inventor:
Philmore F. Sperry Nov. 29, 1938.     P. F. SPERRY     2,138,259
HEATING APPARATUS
Filed April 18, 1936     2 Sheets-Sheet 2

Inventor:
Philmore F. Sperry,
By Zabel, Carlson & Wells
Attorneys

Patented Nov. 29, 1938

2,138,259

UNITED STATES PATENT OFFICE 2,138,259

HEATING APPARATUS

Philmore F. Sperry, Chicago, Ill., assignor to Excel Auto Radiator Company, Chicago, Ill., a corporation of Delaware Application April 18, 1936, Serial No. 75,124

2 Claims. (Cl. 257—137)

This invention relates to heating apparatus and more particularly to heating apparatus of the type used to heat the passenger compartments in automobiles.

The invention is shown as applied to an automobile heater of the type wherein any suitable fluid such as water is heated by the automobile engine and circulated through the heat radiating means, air being brought in contact with the heat radiating means by a fan so as to heat and circulate the air.

It is a purpose of this invention to provide a device of this character wherein the air in the passenger compartment of the car may be better distributed and more quickly heated without any appreciable increase in the area of car space occupied by the heater.

It is also a purpose of this invention to provide a novel heater structure wherein the heat radiator is divided into a plurality of sections so arranged that the flow of air through one section may be directed horizontally into the car while the air going through the other section may be directed downwardly in the car so as to more quickly overcome and more thoroughly prevent the stratification of the air in the car which causes the cold air to settle at the bottom.

Other features and advantages of the invention will become apparent as the description proceeds reference being had to the accompanying drawings wherein the preferred form of the invention is shown.

In the drawings—

Fig. 1 is a front view in elevation of a heater to which the invention has been applied;

Fig. 2 is a sectional view taken on the line 2—2 of Fig. 1;

Figure 3:
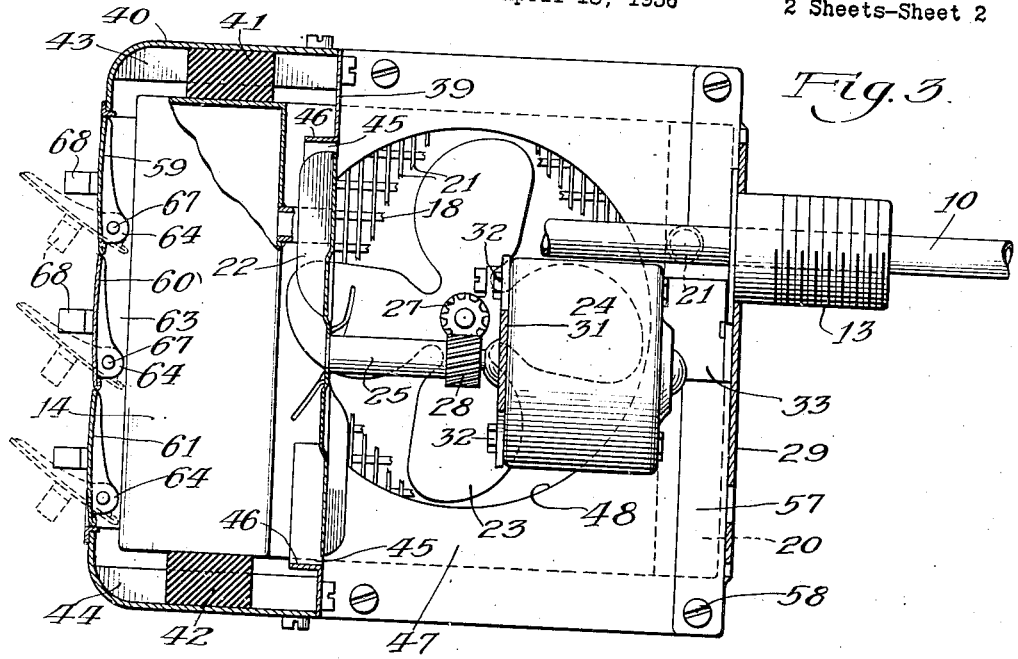
Fig. 3 is a sectional view taken on the line 3—3 of Fig. 2.
Figure 4:
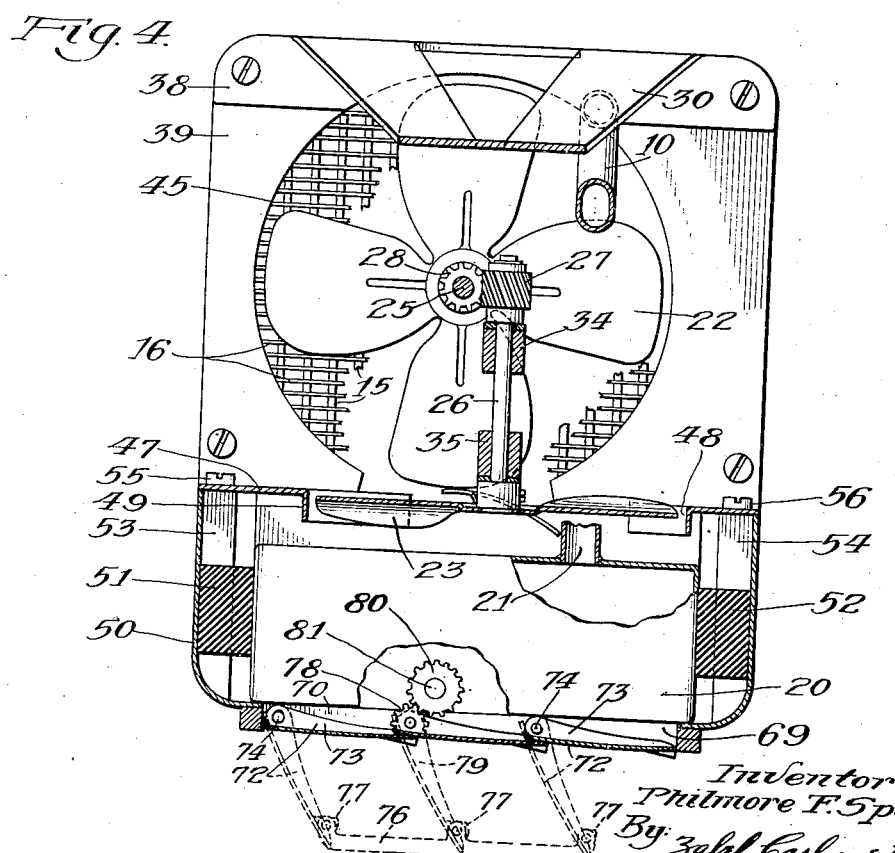
Fig. 4 is a sectional view taken on the line 4—4 of Fig. 2.

Referring now to the drawings, the invention is shown as embodied in a heating apparatus of the type wherein hot water of the automobile radiator system is circulated through a heat radiating means within the passenger compartment of an automobile. An inlet pipe 10 and a return or outlet pipe 11 are provided. These pipes pass through a nipple 12 which is screw threaded as indicated at 13 so that it may be clamped on a dash board by a suitable nut, not shown, to mount the heating device in position. The inlet pipe 10 leads to a header chamber 14 from which water is discharged through a plurality of pipes 15 which have spaced radiating fins 16 mounted thereon. The pipes or tubes 15 lead to a lower header 17 which in turn discharges into a plurality of pipes 18 and 19 that run horizontally from the heater 17 into a third header 20. The pipes 18 and 19 also are provided with spaced radiating fins 21 similar to the fins 16. The heating fluid is discharged from the header 20 through a vertical portion 21 of the outlet pipe 11.

Within the angle formed by the two radiating units interposed between the headers 14, 17, and 20, a pair of fans 22 and 23 are arranged at right angles to each other so as to operate to force air outwardly between the fins 16 and between the fins 21. Two fans are driven by a motor 24, the fan 22 being directly mounted upon a shaft 25 of the motor, and the fan 23 being mounted on a shaft 26 which is driven from the shaft 25 by means of a pair of spiral gears 27 and 28.

The nipple 12 carries a mounting plate 29 on which the various elements of the heater are supported. A top frame plate 30, which is welded or otherwise secured rigidly to the plate 29, carries a bracket 31 to which the motor 24 is bolted by means of suitable bolts 32. The bracket 31 is braced by a brace 33 which runs from the lower end of the bracket 31 back to the plate 29. The bracket 31 also provides means for attaching a pair of bearings 34 and 35 for the shaft 26, the bearings 34 and 35 being secured on the bracket 31 by suitable screws 36 and 37 as will be readily understood.

The plates 29 and 30 also support a suitable housing for the heat radiator. The plate 30 has a downturned end flange 38 which is bolted to a plate 39 and through this plate 39 to a cup shaped housing 40 which is provided with spacing blocks 41 and 42 and mounting blocks 43 and 44 to position the headers 14 and 17 in the housing 40. The plate 39 has an aperture 45 in which the fan 22 operates, this aperture being flanged, as indicated at 46, inwardly toward the radiating unit. The plate 39 has a portion 47 which extends at right angles to the portion covering the cup shaped housing 40, and this portion 47 extends over the pipes 19 and fins 21 and over the header 20. An aperture 48 is provided in the horizontal plate portion 47 to receive the fan 23, and this aperture is surrounded by a flange 49 similar to the flange 46. A second cup shaped housing 50 covers the horizontal heat radiating unit and abuts the cup shaped housing 40 to complete the enclosure of the device.

This second cup shaped housing 50 is provided with suitable spacer blocks 51 and 52 for positioning the header 20. It also has mounting blocks 53 and 54 to which the horizontal portion 47 is secured by means of suitable screws such as 55 and 56. Blocks 53 and 54 are duplicated at the back end of the housing 50, and the housing is secured by means of these blocks to a horizontal flange 57 provided at the lower end of the plate 29 by means of screws 58.

The housing 40 has a front aperture which is covered by a plurality of shutters 59, 60, and 61. These shutters are supported by a pair of frame members 62 and 63, the shutters being provided with suitable ears 64 and 65 which are secured by rivets 66 and 67 to the frame members 62 and 63. Each shutter is provided with a finger piece 68 by means of which it may be opened by the hand. The housing 50 is provided with an aperture 69 facing downwardly, and, at the front and rear ends of the aperture, the housing is provided with downturned flanges 70 and 71 to which a plurality of shutters 72 are hinged, the shutters being provided with suitable flanges 73 riveted by means of rivets 74 to the flanges 70 and 71.

The shutters 59, 60, and 61 are individually operable, but the shutters 72 are somewhat inaccessible, being placed on the bottom of the heating unit. Means are provided whereby these shutters may be operated in unison by turning a hand lever 75 which is located at the front of the housing 40. For this purpose, the three shutters 72 are linked together by a link 76 at their free ends, this link being pivoted as shown to suitable ears 77 provided on the shutters 72. On the central one of the shutters 72 at the end opposite the link 76, a pinion 78 is fixed, for example by soldering or welding it, to a flange 79 on the shutter, and this pinion meshes with a small gear 80 that is carried on a shaft 81 that is journalled in an enlarged portion 82 on the bottom of the housing 40. The hand lever 75 has a hub 83 secured by a set screw 84 to the shaft 81. The header chamber 17 is recessed as shown at 95 to provide space for the gear 80.

It is evident that, by turning the hand lever 75, the gear 80 may be rotated to in turn actuate the pinion 78 for opening and closing the shutters 72.

The operation of the device, it is believed, will be readily understood. Two heat radiating sections are provided at right angles to each other, and air can be forced through either or both of them at a rate controllable by setting the shutters associated therewith. In this fashion, the heating apparatus may be adjusted to give the desired direction to the heated air from the heat radiating units. Arranging the units in this fashion, gives a large radiating surface and a long path of circulation for the heating fluid making for a more rapid transfer of heat from the fluid to the air in the car.

While certain embodiments of the invention have been shown and described, it is to be understood that it is capable of many modifications. Changes, therefore, in the construction and arrangement may be made without departing from the spirit and scope of the invention as disclosed in the appended claims in which it is the intention to claim all novelty inherent in the invention as broadly as possible in view of the prior art.

Having thus described the invention, what I claim as new and desire to secure by Letters Patent is:

1. Heating apparatus of the character described comprising, in combination: a casing; a vertical and a horizontal radiator housed in said casing in L-relationship; a common header at the apex of the angle between the radiators acting as outlet for one of said radiators and inlet for the remaining radiator; inlet and outlet headers for the respective radiators at the free ends thereof; a motor in said casing; and a pair of fans one facing each of said radiators; one of said fans directly driven by the armature shaft of said motor and the other thereof driven by gears from said shaft.

2. The combination of claim 1 with shutters in said casing in front of the respective radiators and with remote control for the shutters facing the horizontal radiator.

PHILMORE F. SPERRY.